US010443440B2

(12) United States Patent
Socha et al.

(10) Patent No.: US 10,443,440 B2
(45) Date of Patent: Oct. 15, 2019

(54) HEAT SHIELD, SYSTEMS AND METHODS

(71) Applicant: United Technologies Corporation, Hartford, CT (US)

(72) Inventors: Pawel Socha, East Hartford, CT (US); Jonathan C Reuben, East Hartford, CT (US); Bret B Cutler, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 963 days.

(21) Appl. No.: 14/682,767

(22) Filed: Apr. 9, 2015

(65) Prior Publication Data

US 2016/0326910 A1 Nov. 10, 2016

(51) Int. Cl.
| | |
|---|---|
| *F01D 25/18* | (2006.01) |
| *F01D 9/06* | (2006.01) |
| *F01D 9/02* | (2006.01) |
| *F01D 25/28* | (2006.01) |
| *F01M 11/02* | (2006.01) |
| *F01D 25/16* | (2006.01) |

(52) U.S. Cl.
CPC ............ *F01D 25/18* (2013.01); *F01D 9/02* (2013.01); *F01D 9/065* (2013.01); *F01D 25/162* (2013.01); *F01D 25/28* (2013.01); *F01M 11/02* (2013.01); *F05D 2230/00* (2013.01); *F05D 2230/54* (2013.01); *F05D 2240/12* (2013.01); *F05D 2240/15* (2013.01); *F05D 2240/50* (2013.01); *F05D 2250/11* (2013.01); *F05D 2260/231* (2013.01); *F05D 2260/98* (2013.01); *Y02T 50/672* (2013.01); *Y02T 50/675* (2013.01)

(58) Field of Classification Search
CPC .......... F01D 9/02; F01D 9/065; F01D 25/162; F01D 25/28; F01M 11/02; F05D 2230/00; F05D 2230/54; F05D 2240/15; F05D 2240/50; F05D 2250/11; F05D 2260/231; F05D 2260/98
USPC ......................................................... 138/110
See application file for complete search history.

(56) References Cited

U.S. PATENT DOCUMENTS

| | | | | |
|---|---|---|---|---|
| 4,085,816 A | * | 4/1978 | Amagai | F01N 13/14 180/89.2 |
| 4,612,767 A | * | 9/1986 | Engquist | F01N 13/14 60/321 |
| 5,598,696 A | * | 2/1997 | Stotts | F02C 7/22 60/740 |

(Continued)

FOREIGN PATENT DOCUMENTS

| | | |
|---|---|---|
| WO | 2014105573 | 7/2014 |
| WO | 2014105602 | 7/2014 |

OTHER PUBLICATIONS

Extended European Search Report dated Sep. 16, 2016 in European Application No. 16164697.1.

(Continued)

*Primary Examiner* — Craig M Schneider
*Assistant Examiner* — David R Deal
(74) *Attorney, Agent, or Firm* — Snell & Wilmer, L.L.P.

(57) ABSTRACT

A heat shield comprising a base portion, a top portion, and a tapered portion extending between the top portion and the bottom portion is described herein, in accordance with various embodiments. The base portion may comprise a sheet metal bounding a triangular void. The top portion may comprise a sheet metal bounding an ovular void.

20 Claims, 4 Drawing Sheets

(56) References Cited

U.S. PATENT DOCUMENTS

| | | | | | |
|---|---|---|---|---|---|
| 6,598,389 | B2* | 7/2003 | Chen | | F01N 13/102 |
| | | | | | 123/169 PH |
| 7,458,209 | B2* | 12/2008 | Hofmann | | B60R 13/0838 |
| | | | | | 60/322 |
| 7,559,142 | B2* | 7/2009 | Patel | | F02C 3/145 |
| | | | | | 29/416 |
| 7,775,047 | B2* | 8/2010 | Fish | | F02C 7/222 |
| | | | | | 60/739 |
| 7,823,643 | B2* | 11/2010 | Wong | | F16L 59/18 |
| | | | | | 138/149 |
| 7,856,811 | B2* | 12/2010 | Ell | | B60R 13/0876 |
| | | | | | 180/309 |
| 8,151,870 | B2* | 4/2012 | Woodson | | F28F 19/002 |
| | | | | | 122/DIG. 13 |
| 8,844,643 | B2* | 9/2014 | Mickelsen | | A62C 3/08 |
| | | | | | 169/11 |
| 2004/0083714 | A1* | 5/2004 | Tsuruta | | F01N 13/14 |
| | | | | | 60/272 |
| 2004/0261875 | A1* | 12/2004 | Witemyre | | F16L 9/147 |
| | | | | | 138/114 |
| 2005/0199445 | A1* | 9/2005 | Zalewski | | F01D 25/183 |
| | | | | | 184/6.5 |
| 2006/0054233 | A1* | 3/2006 | Prociw | | F16L 59/026 |
| | | | | | 138/149 |
| 2010/0316484 | A1* | 12/2010 | Jasko | | F01D 9/041 |
| | | | | | 415/1 |
| 2011/0085895 | A1 | 4/2011 | Durocher et al. | | |
| 2011/0299983 | A1* | 12/2011 | Delitz | | F02C 6/12 |
| | | | | | 415/213.1 |
| 2013/0189071 | A1* | 7/2013 | Durocher | | F01D 9/065 |
| | | | | | 415/1 |

OTHER PUBLICATIONS

European Patent Office, European Search Report dated Sep. 19, 2018 in Application No. 16164697.1-1006.

* cited by examiner

HEAT SHIELD, SYSTEMS AND METHODS

FIELD

This disclosure relates to a gas turbine engine, and more particularly to heat shields for oil tube fittings.

BACKGROUND

Engine oil tubes and fittings may be subjected to relatively high temperatures. Once subjected to excessive heating, oil may undergo coking Oil coking may cause solid oil deposits to form within oil tubes, causing undesirable effects such as blocked passageways and filters.

SUMMARY

A heat shield is described herein, in accordance with various embodiments. A heat shield may comprise a base portion, a top portion, and a tapered portion extending between the top portion and the bottom portion. The base portion may comprise a sheet metal bounding a triangular void. The top portion may comprise a sheet metal bounding an ovular void.

A lubricating assembly is described herein, in accordance with various embodiments. A lubricating assembly may include an oil tube, a fitting, and a heat shield. The fitting may be configured to be attached to the oil tube. The heat shield may be configured to be attached to the oil tube. In various embodiments, the oil tube may be dual wall oil tube comprising an inner wall and an outer wall.

A method of cooling an oil tube fitting is disclosed herein, in accordance with various embodiments. The method of cooling an oil tube fitting may include disposing a heat shield about an oil tube. When in the installed position, the heat shield may at least partially encase an oil tube fitting. When in the installed position and during operation, the heat shield may be configured to prevent heat transfer between the oil tube fitting and surrounding hot air. When in the installed position, the heat shield may be configured to be separated from the oil tube fitting by a gap.

Introducing a heat shield may prevent oil tube fittings from excessively heating, preventing oil coking.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
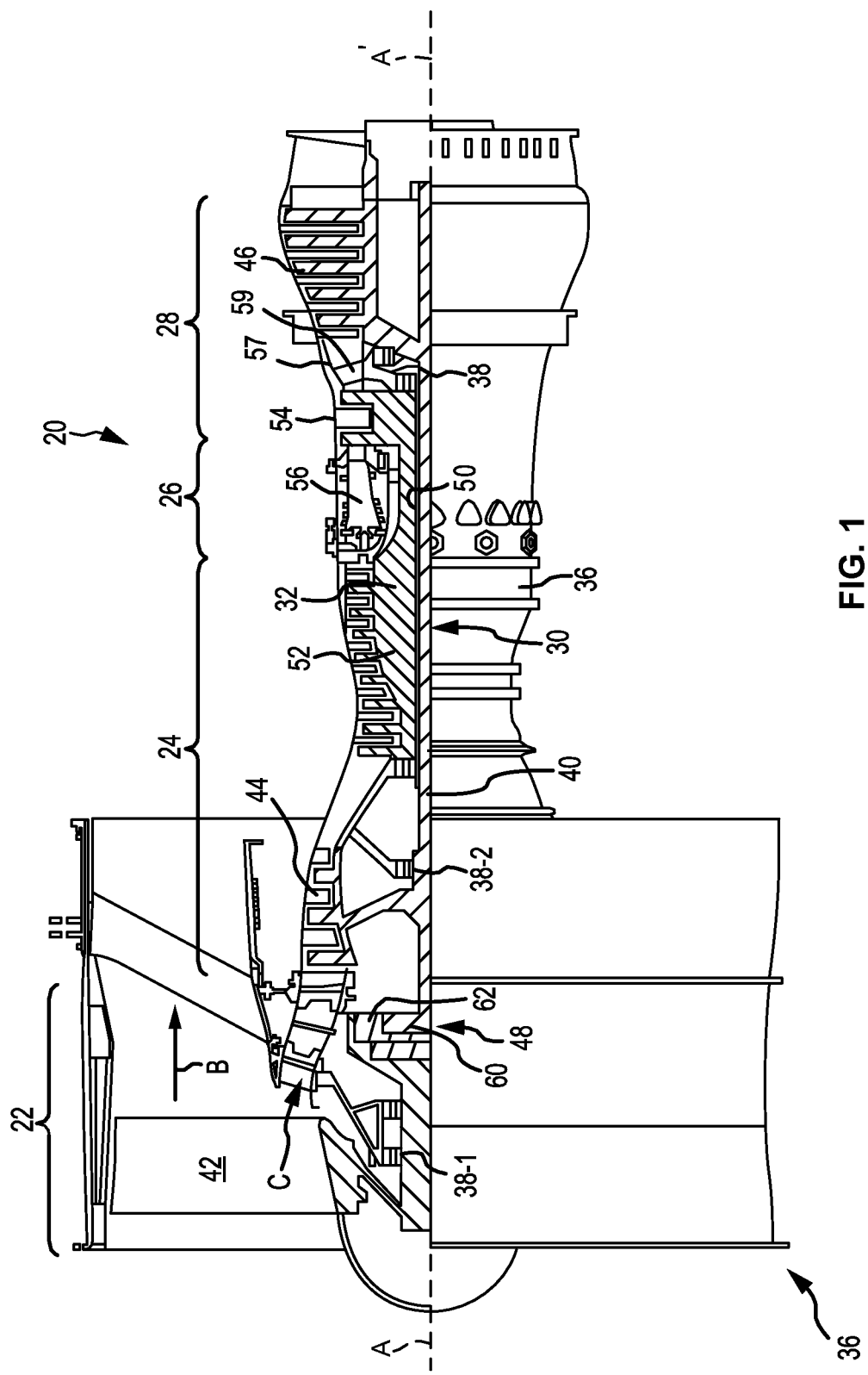
FIG. 1 illustrates an example gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of gas turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 (e.g., a second compressor section) and high pressure (or second) turbine section ("HPT") 54. A combustor 56 may be located between high pressure compressor 52 and HPT 54. A mid-turbine frame 57 of engine static structure 36 may be located generally between HPT 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over HPT 54 and low pressure turbine 46. Mid-turbine frame 57 includes airfoils 59 which are in the core airflow path. Low pressure turbine 46 and HPT 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2A:
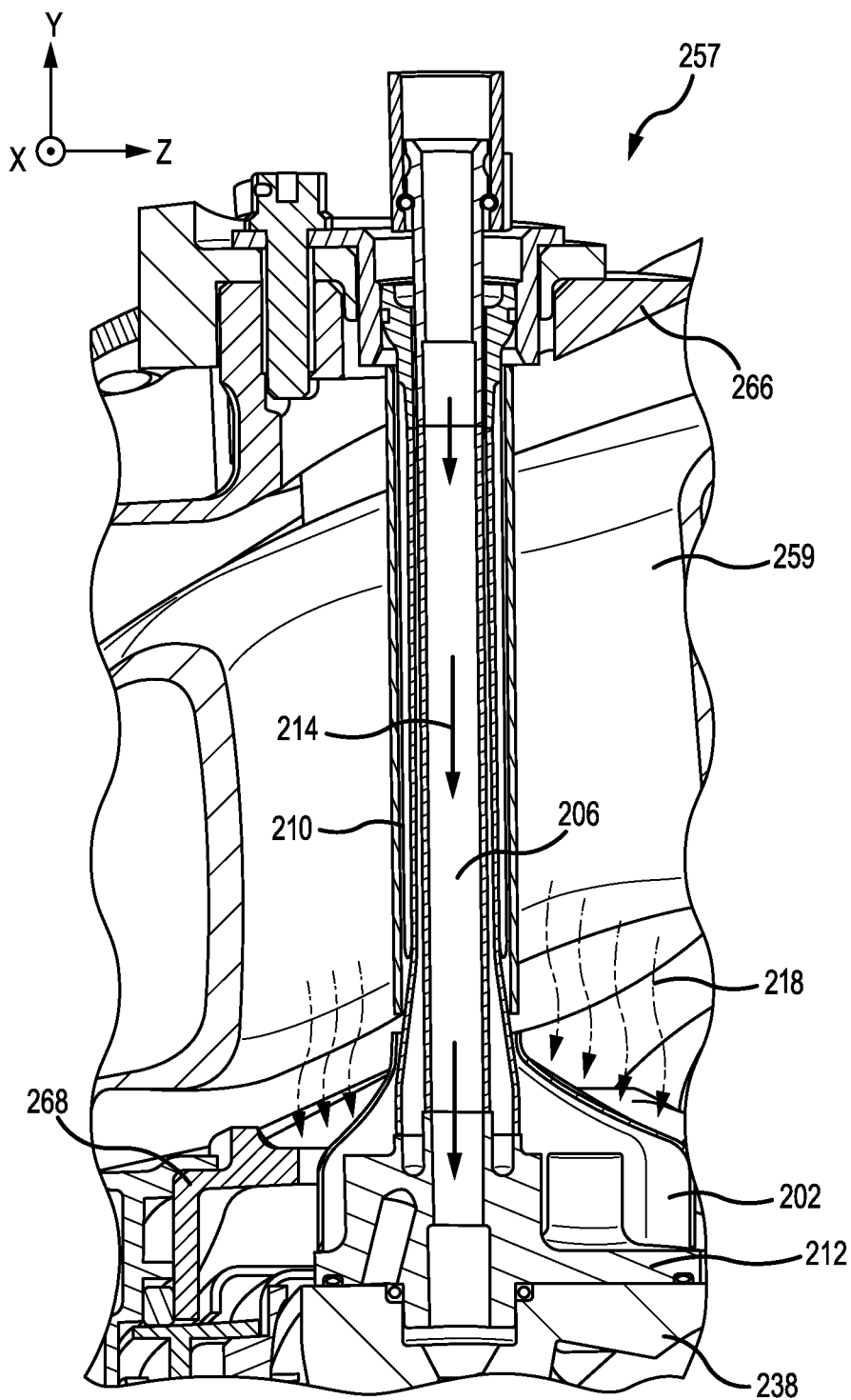
FIG. 2A illustrates a schematic view of an example mid-turbine frame assembly, in accordance with various embodiments.

In various embodiments, with reference to FIG. 2A, a mid-turbine frame (MTF) assembly is illustrated. MTF assembly 257 may include bearing compartment 238, outer case 266, and inner case 268. MTF vane 259 may be located between inner case 268 and outer case 266. Oil tube fitting 212 may be attached to a portion of bearing compartment 238. Oil tube 206 may extend between outer case 266 and oil tube fitting 212. Oil 214 may be located within oil tube 206. Oil 214 may be used to lubricate at least a portion of bearing compartment 238. Oil tube 206 may be located at least partially within MTF vane 259. Sleeve 210 may encase at least a portion of oil tube 206. Oil tube fitting heat shield (also referred to herein as heat shield) 202 may be located between MTF vane 259 and oil tube fitting 212.

Extremely hot exhaust may impinge on MTF vane 259 which may cause MTF vane 259 to increase in temperature due to convective heat transfer from the hot exhaust. Heat waves 218 may radiate from MTF vane 259. In various embodiments, heat waves may radiate to other nearby components which may cause the nearby components to increase in temperature. In return, the nearby components may transfer heat conductively to other adjacent components and/or fluids. For example, heat waves may radiate from MTF vane 259 to oil tube 206 which may convectively transfer heat from MTF vane 259 to oil tube 206. Heat may be conductively transferred to oil located inside oil tube 206. Furthermore, when oil exceeds various threshold temperatures, it may undergo severe oxidative and thermal breakdown which may cause solid deposits to form. These deposits may be undesirable as they may impede the flow of fluid through various components including, for example, tubes and filters. Heat shield 202 may be configured to block heat waves 218 radiating from MTF vane 259 from directly impinging on oil tube fitting 212. Furthermore, heat shield 202 may help minimize convective heat transfer from hot air surrounding oil tube fitting 212. Accordingly, heat shield 202 may help block heat from being transferred to oil tube fitting 212. In various embodiments, heat shield 202 may help prevent oil from coking within oil tube fitting 212. Sleeve 210 may be configured to block radiating heat waves from MTF vane 259 from impinging on oil tube 206.

Figure 2B:
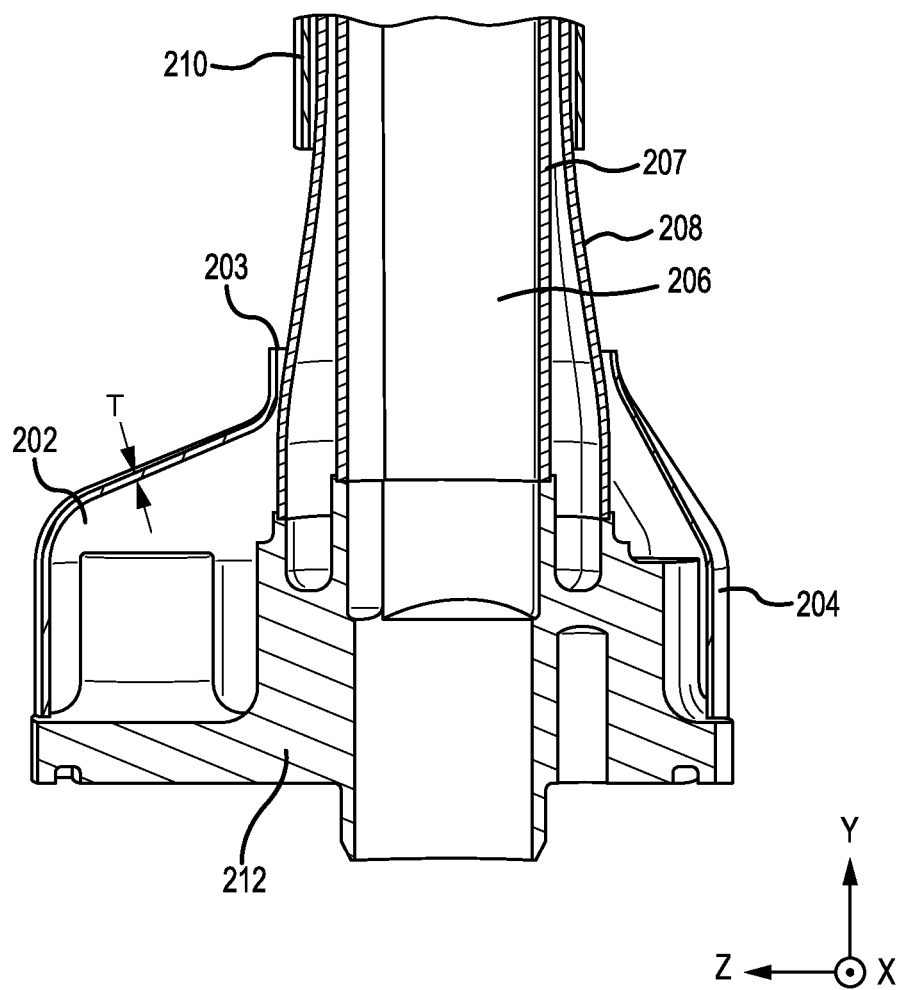
FIG. 2B illustrates a schematic view of an oil tube fitting heat shield assembly, in accordance with various embodiments.

In various embodiments, with reference to FIG. 2B, oil tube 206 may comprise an inner tube 207 and an outer tube 208. Accordingly, oil tube 206 may be referred to as a dual wall tube. Inner tube 207 may be enclosed by outer tube 208. There may be a space between inner tube 207 and outer tube 208 which may be occupied by air. The outer tube 208 may be configured to contain oil within outer tube 208 in the event that there is an oil leak from inner tube 207. Outer tube 208 may be configured to prevent heat transfer from surrounding hot air to inner tube 207. Oil tube 206 may be configured to attach to oil tube fitting 212. Oil tube 206 may be attached to oil tube fitting 212 via weld, solder, braze, or any other suitable method. Heat shield 202 may comprise a base portion 204 and a top portion 203. Top portion 203 of heat shield 202 may be configured to attach to oil tube 206. Top portion 203 of heat shield 202 may be configured to attach to oil tube 206 via weld, solder, braze, or any other suitable method. Top portion 203 of heat shield 202 may be configured to attach to oil tube 206 in close proximity to an end of oil tube 206. Top portion 203 of heat shield 202 may be configured to attach to oil tube 206 in close proximity to a proximal end of oil tube 206. Top portion 203 of heat shield 202 may be configured to attach to oil tube 206 such that there is a small gap between heat shield 202 and sleeve 210. Base portion 204 of heat shield 202 may be configured to at least partially encase oil tube fitting 212.

In various embodiments, various components of MTF assemblies may comprise various materials. Various components, including heat shield 202, may comprise a high temperature metal (e.g., an austenitic nickel-chromium-based alloy such as INCONEL), a high temperature composite, and/or the like. In further embodiments, heat shield 202 may comprise a high temperature stainless steel.

In various embodiments, heat shield 202 may comprise a wall thickness "T." In various embodiments, heat shield 202 may be manufactured via a hydro-forming process. Wall thickness "T" may be chosen according to various design considerations. In various embodiments, wall thickness "T" may be between 0.010 in (0.25 mm) and 0.030 in (0.76 mm) in thick. During manufacturing, sheet metal of a preferred wall thickness may be chosen to be hydro-formed to the desired heat shield geometry. For example, if a heat shield comprising a wall thickness of 0.5 mm is desired, a piece of sheet metal comprising a wall thickness of 0.5 mm may be used and formed into the desired geometry using high pressure hydraulic fluid to press the sheet metal into a die in a process known as hydro-forming. In various embodiments, a single piece of sheet metal may be hydro-formed into heat shield 202. In various embodiments, two or more pieces of sheet metal may be hydro-formed into different geometries and welded together to form heat shield 202.

Figure 3A:
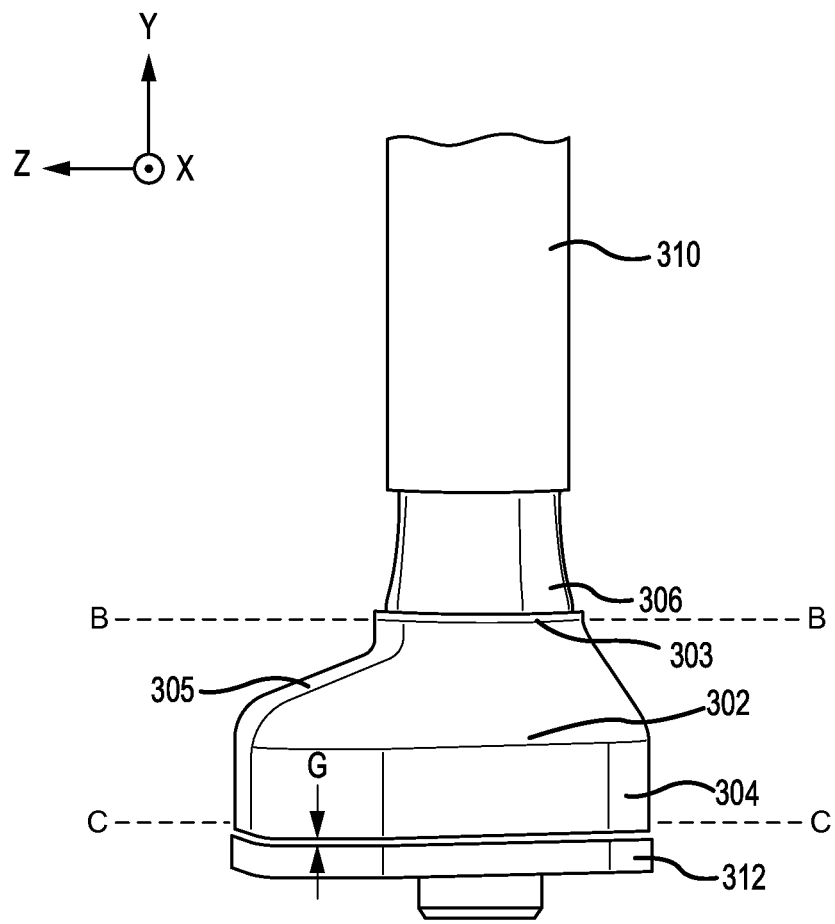
FIG. 3A illustrates a side view of an oil tube fittings heat shield assembly, in accordance with various embodiments.
Figure 3B:
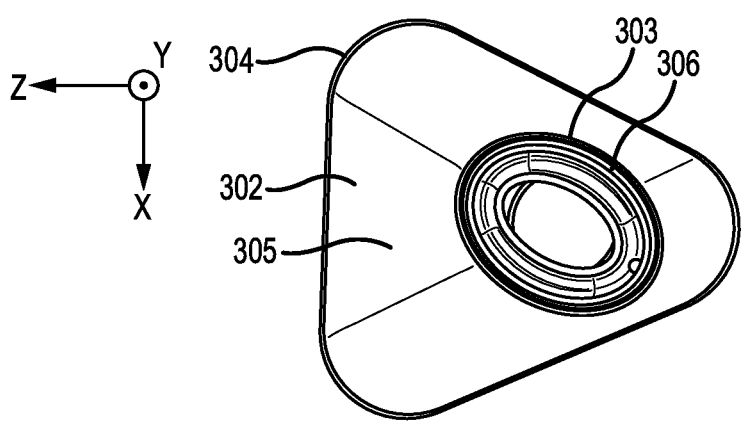
FIG. 3B illustrates a top view of an oil tube fitting heat shield, in accordance with various embodiments.

With reference to FIG. 3A and FIG. 3B, elements with like element numbering as depicted in FIG. 2A and FIG. 2B, are intended to be the same and certain properties, including material properties, will not be repeated for the sake of clarity.

In various embodiments, with reference to FIG. 3A and FIG. 3B, oil tube fitting 312 may be separated from heat shield 302 by a gap "G". Heat shield 302 may be configured to be separated from oil tube fitting 312 by gap "G" such that a conductive thermal path does not exist between heat shield 302 and oil tube fitting 312. Gap "G" may be configured to be minimal while allowing thermal expansion of heat shield 302 and oil tube fitting 312 without creating a thermal conduction path between heat shield 302 and oil tube fitting 312. Minimizing gap "G" may allow heat shield 302 to more effectively minimize convective heat transfer between oil tube fitting 312 and surrounding hot air. Minimizing gap "G" may allow heat shield 302 to more effectively minimize convective heat transfer between oil tube fitting 312 and radiated heat from an adjacent MTF vane.

In various embodiments, the base portion 304 of heat shield 302 may comprise a triangular geometry. For example, FIG. 3B illustrates the base portion 304 of heat shield 302, wherein the base portion bounds a triangular void. In various embodiments, the base portion 304 of heat shield 302 may comprise one of a square, rectangular, oblong, round, elliptical, or any other geometry. The geometry of the base portion 304 of heat shield 302 may be driven by the geometry of oil tube fitting 312. Accordingly, the geometry of oil tube fitting 312 and base portion 304 may be complementary. In various embodiments, the top portion 303 of heat shield 302 may comprise an ovular geometry. For example, FIG. 3B illustrates the top portion 303 of heat shield 302, wherein the top portion 303 bounds an ovular void. In various embodiments, the top portion 303 of heat shield 302 may comprise a square, rectangular, oblong, round, elliptical, or any other geometry. The geometry of the top portion 303 of heat shield 302 may be driven by geometry of oil tube 306. Accordingly, the geometry of oil tube 306 and top portion 303 may be complementary. In various embodiments, the geometry of top portion 303 and base portion 304 may be complementary. In various embodiments, the geometry of top portion 303 and base portion 304 may be different. In various embodiments, top portion 303 may be connected to base portion 304 by a tapered portion 305.

In various embodiments, top portion 303 may comprise a cross-sectional area. The cross-sectional area of top portion 303 may be the area of a slice of top portion 303 taken along line B-B in the x-z plane according to the coordinates provided in FIG. 3A. The cross-sectional area of top portion 303 may be best visualized by viewing top portion 303 from the top view as shown in FIG. 3B. In various embodiments, base portion 304 may comprise a cross-sectional area. The cross-sectional area of base portion 304 may be the area of a slice of base portion 304 taken along line C-C in the x-z plane according to the coordinates provided in FIG. 3A. The cross-sectional area of base portion 304 may be best visualized by viewing base portion 304 from the top view as shown in FIG. 3B.

A method of cooling an oil tube fitting is disclosed herein, in accordance with various embodiments. The method of cooling an oil tube fitting may include disposing a heat shield about an oil tube. When in the installed position, the heat shield may at least partially encase an oil tube fitting. When in the installed position and during operation, the heat shield may be configured to prevent heat transfer between the oil tube fitting and surrounding hot air. When in the installed position, the heat shield may be configured to be separated from the oil tube fitting by a gap.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lubricating assembly comprising:
   an oil tube,
   a fitting attached to the oil tube, wherein the fitting is configured to receive a fluid from the oil tube; and
   a heat shield attached to the oil tube, wherein the heat shield comprises:
      a base portion, wherein the base portion bounds a first void;
      a top portion, wherein the top portion bounds a second void; and
      a tapered portion extending between the base portion and the top portion;
   wherein the top portion is attached directly to the oil tube, and
   the base portion surrounds the fitting.

2. The lubricating assembly of claim 1, wherein the oil tube is a dual wall oil tube comprising an inner wall and an outer wall.

3. The lubricating assembly of claim 2, wherein the heat shield is manufactured via a hydro-forming process.

4. The lubricating assembly of claim 2, wherein the heat shield comprises at least one of a nickel-chromium based alloy and a stainless steel.

5. The lubricating assembly of claim 2, wherein the outer wall is coupled to the fitting and the inner wall is coupled to the fitting.

6. The lubricating assembly of claim 1, wherein the heat shield is configured to at least partially encase the fitting.

7. The lubricating assembly of claim 6, wherein the heat shield is configured to prevent heat transfer between the fitting and surrounding air.

8. The lubricating assembly of claim 6, wherein the heat shield and the fitting are separated by a gap.

9. The lubricating assembly of claim 1, wherein the top portion comprises a smaller cross-sectional area than the base portion.

10. The lubricating assembly of claim 9, wherein the base portion bounds a triangular void.

11. The lubricating assembly of claim 9, wherein the top portion bounds an ovular void.

12. The lubricating assembly of claim 1, wherein the fitting is attached to a proximal end of the oil tube.

13. The lubricating assembly of claim 1, wherein a geometry of the top portion is complementary to a geometry of the oil tube and a geometry of the base portion is complementary to a geometry of the fitting.

14. The lubricating assembly of claim 1, wherein the top portion is attached to the oil tube via at least one of a weld, a solder, or a braze.

15. The lubricating assembly of claim 1, wherein the oil tube is attached to the fitting via at least one of a weld, a solder, or a braze.

16. The lubricating assembly of claim 1, further comprising:
   a mid-turbine frame (MTF) arrangement comprising:
      an outer engine case;
      an inner engine case disposed radially inward from the outer engine case, the oil tube extending between the outer engine case and the inner engine case; and
      a bearing compartment disposed radially inward from the inner engine case;
   wherein the fitting is coupled to the bearing compartment and is configured to direct the fluid from the oil tube to the bearing compartment.

17. A method of cooling an oil tube fitting comprising:
   coupling a heat shield to an outer surface of an oil tube; and
   coupling the oil tube to the oil tube fitting, wherein the oil tube fitting is configured to receive a fluid from the oil tube, the heat shield at least partially encases the oil tube fitting, and the heat shield comprises:
      a base portion, wherein the base portion bounds a first void;
      a top portion, wherein the top portion bounds a second void; and
      a tapered portion extending between the base portion and the top portion, wherein the top portion is attached directly to the oil tube and the base portion surrounds the oil tube fitting.

18. The method of cooling an oil tube fitting of claim 17, further comprising reflecting, by the heat shield, a heat wave away from the oil tube fitting.

19. The method of cooling an oil tube fitting of claim 17, wherein the heat shield is configured to be separated from the oil tube fitting by a gap.

20. The method of cooling an oil tube fitting of claim 17, further comprising hydro-forming the heat shield.

* * * * *